(12) United States Patent
Øhrn

(10) Patent No.: US 11,756,003 B2
(45) Date of Patent: Sep. 12, 2023

(54) GENERATING SOCIAL PROXIMITY INDICATORS FOR MEETINGS IN ELECTRONIC SCHEDULES

(71) Applicant: MICROSOFT TECHNOLOGY LICENSING, LLC, Redmond, WA (US)

(72) Inventor: Aleksander Øhrn, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 16/774,807

(22) Filed: Jan. 28, 2020

(65) Prior Publication Data

US 2021/0233037 A1    Jul. 29, 2021

(51) Int. Cl.
*G06Q 10/1093* (2023.01)
*H04L 12/18* (2006.01)

(52) U.S. Cl.
CPC ..... *G06Q 10/1095* (2013.01); *H04L 12/1827* (2013.01); *H04L 12/1831* (2013.01)

(58) Field of Classification Search
CPC ............ G06Q 10/1095; H04L 12/1827; H04L 12/1831
See application file for complete search history.

(56) References Cited

U.S. PATENT DOCUMENTS

| | | | |
|---|---|---|---|
| 8,375,034 B2 | 2/2013 | Norton et al. | |
| 8,396,734 B2 | 3/2013 | Mock | |
| 9,704,205 B2 * | 7/2017 | Akutagawa | A61B 10/0064 |
| 9,973,550 B2 | 5/2018 | Haskins et al. | |
| 10,249,006 B2 | 4/2019 | Redfern et al. | |
| 10,438,172 B2 | 10/2019 | Rangan | |
| 2007/0071209 A1 * | 3/2007 | Horvitz | G06Q 10/109 379/201.06 |
| 2008/0091662 A1 * | 4/2008 | Franke | G06Q 30/0211 |

(Continued)

OTHER PUBLICATIONS

"International Search Report and Written Opinion Issued in PCT Application No. PCT/US21/014046", dated Apr. 20, 2021, 11 Pages.

(Continued)

*Primary Examiner* — Patrice L Winder
*Assistant Examiner* — Angela M De Widhalm Rodriguez
(74) *Attorney, Agent, or Firm* — Holzer Patel Drennan

(57) ABSTRACT

Technology is disclosed for determining a social proximity of attendees of a meeting within an electronic schedule. Information within relational profiles for the attendees may be utilized to identify interaction patterns (e.g., how often attendees communicate, what mode of communication is used) and commonalities (e.g., common social media connections, common domains). This information may be utilized to determine a set of attendee proximity scores for groups of attendees, such as a pair of attendees. Based on the attendee proximity scores determined for the meeting, an overall meeting proximity score may be determined for the meeting. The meeting proximity score may be utilized to generate a proximity indicator for the meeting event that will form at least part of the graphic interface component for the meeting event. The meeting proximity score may alternatively or additionally be used to create meetings by determining meeting details and meeting conflict resolution.

20 Claims, 6 Drawing Sheets

(56) References Cited

U.S. PATENT DOCUMENTS

| | | | | |
|---|---|---|---|---|
| 2008/0098313 | A1* | 4/2008 | Pollack | G06Q 10/10 715/753 |
| 2009/0165022 | A1* | 6/2009 | Madsen | G06Q 10/109 719/318 |
| 2009/0313074 | A1 | 12/2009 | Harpur et al. | |
| 2010/0169145 | A1* | 7/2010 | O'Sullivan | G06Q 10/1095 705/7.19 |
| 2012/0158751 | A1* | 6/2012 | Tseng | G06F 16/9535 707/751 |
| 2014/0013240 | A1* | 1/2014 | Ganesh | G06Q 50/01 715/753 |
| 2014/0081882 | A1* | 3/2014 | Govindaraman | G06Q 50/01 705/319 |
| 2014/0223338 | A1* | 8/2014 | Okocha | G06Q 10/10 715/762 |
| 2015/0172855 | A1* | 6/2015 | Mishra | H04W 4/023 455/418 |
| 2016/0364698 | A1* | 12/2016 | Bouz | G06Q 10/1095 |
| 2017/0091713 | A1* | 3/2017 | Paris | G06Q 10/1093 |
| 2017/0098197 | A1* | 4/2017 | Yu | G06Q 30/02 |
| 2017/0221072 | A1* | 8/2017 | AthuluruTlrumala | H04W 8/18 |
| 2019/0340579 | A1* | 11/2019 | Krystek | G06N 3/088 |
| 2020/0107155 | A1* | 4/2020 | Williams | G06F 21/36 |
| 2021/0110352 | A1* | 4/2021 | Dunne | G06F 16/9024 |

OTHER PUBLICATIONS

"Assign a Color Category to a Calendar Appointment, Meeting, or Event", Retrieved from: https://support.office.com/en-us/article/assign-a-color-category-to-a-calendar-appointment-meeting-or-event-750596d9-707d-4412-8c0e-7fdc0fc52527, May 16, 2019, 7 Pages.

"Syncing Calendar Items (Meetings, Appointments, Events) in Salesforce via SmartCloud Connect", Retrieved from https://smartcloudconnect.io/docs/fast-channel/articles/Saving-Calendar-Items-in-Salesforce-(Adaptive-view)/, Retrieved Date: Oct. 16, 2019, 21 Pages.

\* cited by examiner

FIG. 5

GENERATING SOCIAL PROXIMITY INDICATORS FOR MEETINGS IN ELECTRONIC SCHEDULES

BACKGROUND

Computer systems allow users to generate and manage electronic schedules that identify a user's meetings. There is often a need to quickly grasp and make sense of information within a user's schedule and to help organize the schedule in a meaningful way. As a user's electronic schedule becomes busier with meetings, the cognitive load required for the user to understand the user's overall schedule and details about particular meetings increases while the ability to organize the schedule decreases. Further, a fuller electronic schedule is more likely to have conflicting meetings, and rescheduling conflicting meetings requires knowledge of meeting details, such as the meeting attendees, to make an informed decision. At the same time, however, including the particular details for each meeting, such as the names of all the attendees, within a calendar view may not be feasible due to limitations in screen size and could further increase the cognitive burden. Conventional schedule applications lack the functionality to generate easy-to-digest cues for meetings that would quickly convey relevant information in a meaningful way to the user to aid in understanding the electronic schedule and, if needed, rescheduling meetings.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present disclosure enable improved electronic scheduling technology by automatically generating a signal of a social proximity for a meeting or event within an electronic schedule where the signal may be consumed by one or more services to facilitate management of a user's electronic schedule. For example, embodiments may include generating proximity indicators for meetings within an electronic schedule based on information about the meeting attendees, including the user, and may represent inferences made about the social proximity between the user and other meeting attendees. The proximity indicators may be used to facilitate organization and management of the user's electronic schedule. The generated social proximity signal may further be utilized to reschedule meetings (or events) and make suggestions for new meeting details.

Information about meeting attendees is utilized to make inferences about the social proximities between meeting attendees. As such, for a meeting scheduled on a user's electronic schedule, each attendee may be determined, and an attendee proximity score for relationships between attendees may be determined. A meeting proximity score may then be determined from the attendee proximity scores for that particular meeting. The meeting proximity score is utilized to generate a proximity indicator that represents the meeting proximity score and is added to the user's electronic schedule within a scheduling application.

As used herein, an attendee proximity score between attendees indicates a social proximity between at least two attendees. An attendee proximity score may be determined from information in relational profiles for meeting attendees, including the user. The relational profiles may include information about a meeting attendee, such as the meeting attendee occupation, domain, place of residence, as well as information about relationships between attendees, such as the attendees being connected to one another on a social media platform or attending meetings together in the past.

From the relational profiles, information about the attendees' historical interactions, including information about past electronic communications may be determined. For instance, in some aspects, the frequency with which the attendees have communicated, the modes of communication, and the topics of communication may be determined. The relational profiles may also be compared or mapped to identify commonalities among the attendees, such as common hobbies, interests, or traits.

This information determined from the relational profiles may be utilized to determine and assign an attendee proximity score for a group, such as a pair, of attendees. A heuristic technique, a supervised or unsupervised machine learning technique, or other process as described herein, may be utilized to determine the attendee proximity information for that group. In one embodiment, for instance, a clustering technique is utilized. An attendee proximity score, which may be in the form of a vector, may be determined for each group of attendees associated with a particular meeting. In example embodiments, an attendee proximity score is determined for pairs of attendees with each pair including the user of the electronic schedule for which the proximity score is being determined. In some embodiments, an attendee proximity score is also determined for any pair of attendees that does not include the user.

Based on the of the attendee proximity scores determined for a meeting, a meeting proximity score may be determined. A meeting proximity score indicates an overall or prevailing social proximity of attendees of the meeting. Where only one attendee proximity score is determined for a meeting, such as when there are only two attendees, the meeting proximity score may be determined from that one attendee proximity score. In other instances where there are multiple attendee proximity scores determined for a meeting, the attendee proximity scores may be combined to determine the meeting proximity score.

The meeting proximity score may be provided to a computing application or service, such as an electronic scheduling application or related service, or may be provided as an application programming interface (API) to facilitate consumption of the determined meeting proximity score by an application or service. For instance, in some embodiments, a proximity indicator for the meeting is generated based on the determined meeting proximity score for use within a scheduling application. The proximity indicator is a perceptible marker, such as a visual or audio marker, of a meeting's overall proximity score. For instance, a color may be associated with different meeting proximity scores, and, based on a meeting proximity score for a particular meeting, at least part of the graphic interface component for that meeting may presented as the associated color. A proximity indicator may be generated for each meeting within the user's electronic schedule or within a subset of the electronic schedule. These proximity indicators for the meetings may be provided to the user in a calendar view or list view, such as by color coding the individual meetings in accordance with the meeting proximity score.

Further, in some aspects, the determined meeting proximity scores may be utilized for meeting conflict resolution or to suggest meetings to reschedule. In other aspects, the meeting proximity scores may be utilized to make suggestions for other meeting attributes, such as time/date, venue, and location, when a user is creating a meeting invitation to other attendees.

BRIEF DESCRIPTION OF THE DRAWINGS

Aspects of the disclosure are described in detail below with reference to the attached drawing figures, wherein:

FIG. 5 illustratively depicts an exemplary screenshot from a personal computing device showing aspects of an example graphical user interface, in accordance with an embodiment of the present disclosure.

DETAILED DESCRIPTION

Figure 1:
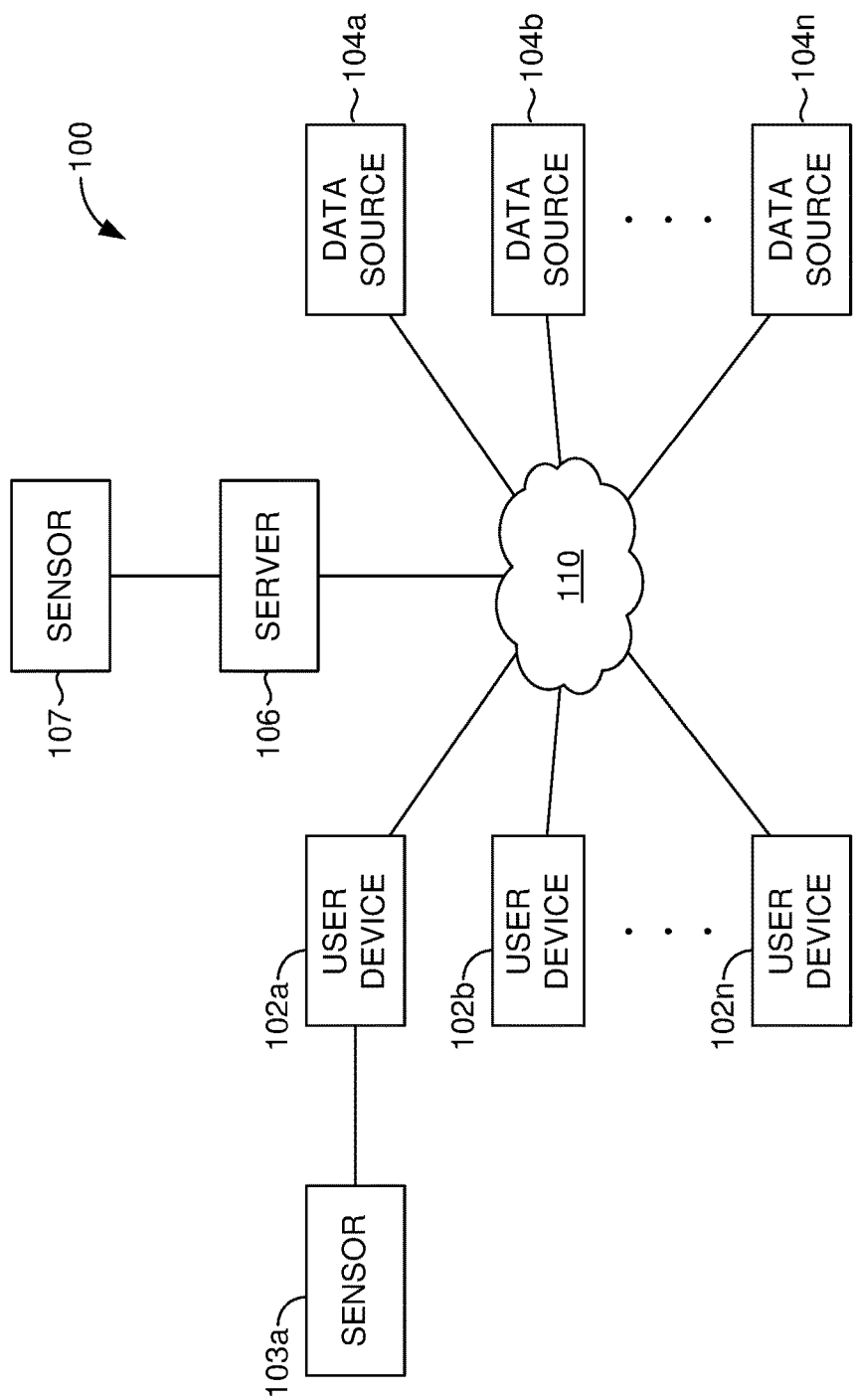
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic scheduling systems through automatically generating indicators of a meeting's proximity (which may also be referred to as a social proximity score) based on information about the attendees associated with the meeting. As described herein, social proximity may be utilized to facilitate generation of a user interface to more efficiently convey meeting attendee information.

Additionally or alternatively, aspects may include utilizing social proximity to facilitate meeting scheduling or conflict resolution. For example, where two meetings conflict, it may be easier to reschedule the meeting where the attendees have a closer social proximity to the user (e.g., where the attendees are close friends of the user) than a meeting where the attendees are less acquainted. As such, embodiments of the disclosed technology may include making inferences about relationships between meeting attendees to determine a social proximity for meetings within a user's electronic schedule and, when necessary, identify which meetings to reschedule. In another example embodiment, the social proximity may be utilized to recommend meeting details, such as venue, location, and time/date. For instance, when a user is creating a meeting event in which the other attendees are co-workers, an available time during the user's set work hours may be proposed for scheduling the meeting.

As used herein, a meeting may be an arranged assembly of individuals (attendees). A meeting may refer to an assembly of the attendees to discuss a particular topic or accomplish a particular goal; however, a meeting may also be a social gathering or event or an appointment. Additionally, a meeting may occur online (e.g., through an online meetings application or online voice call) or offline (e.g., telephone call or in-person meeting).

Generally, computer systems allow users to create and manage electronic schedules (which may also be referred to herein as electronic calendars) that identify a user's meetings. There is often a need for the user to quickly grasp and make sense of information within the user's schedule and to help organize the schedule in a meaningful way. As a user's electronic schedule becomes busier with meetings, the cognitive load required to understand the user's overall schedule and details about particular meetings increases while the ability to organize the schedule decreases. Additionally, a fuller electronic schedule is more likely to have conflicting meetings. To make informed rescheduling decisions, knowledge about meeting details, such as who the attendees are, is needed. At the same time, however, providing the particular details for each meeting, such as the names of all the attendees, in a user interface for the user's schedule may not be feasible due to limitations in screen size and could further increase the cognitive burden in understanding the schedule. Conventional scheduling applications lack the functionality to quickly convey relevant information about a meeting in a meaningful way to aid the user in understanding the electronic schedule and, if needed, rescheduling meetings.

To reduce this overhead, facilitate enhanced organization and presentation of scheduling information, improve the user computing experience, and provide other benefits described herein, embodiments of the present disclosure provide improved electronic scheduling technology by automatically generating a signal (which may be broadly defined to be an indicator, piece of information, or stream of information) of a social proximity for a meeting. The meeting may be within or associated with an electronic schedule, and the signal may be consumed by one or more computing applications or services to facilitate management of a user's electronic schedule. For example, embodiments may include generating proximity indicators for meetings within an electronic schedule based on information about the meeting attendees, including the user, and may represent inferences made about the social proximity between the user and other meeting attendees. The proximity indicators may be used to facilitate organization and management of the user's electronic schedule. The generated social proximity signal may further be utilized for meeting conflict resolution, to reschedule meetings, and/or make suggestions for new meeting details.

At a high level and according to some embodiments, information about meeting attendees is utilized to make inferences about the social proximities between meeting attendees. Social proximity, as used herein, is intended to provide a measurement of connectedness among individuals; the term "social" is not limited to "non-business" relationships and it may encompass relationships with only business connections. In determining the social proximity to be assigned to a particular meeting scheduled on a user's electronic schedule, each attendee may be determined, and an attendee proximity score for relationships between attendees may be determined. In some embodiments, for example, an attendee proximity score is determined for pairs of attendees within the meeting attendees. A meeting proximity score may then be determined from the attendee proximity scores for that particular meeting. The meeting proximity score may be provided to a computing application or service, such as an electronic scheduling application or related service, or may be provided as an application programming interface (API) to facilitate consumption of the determined meeting proximity score by an application or service. In some embodiments, for instance, the proximity meeting score is utilized to generate a proximity indicator that represents the meeting proximity score and is added to the user's electronic schedule within a scheduling application.

As used herein, an attendee proximity score between attendees indicates a social proximity between at least two attendees. For example, an attendee proximity score indicating a social proximity may be a value (numerical or categorical) indicating a degree of closeness, such as very close, somewhat close, or not close. Alternatively or additionally, an attendee proximity score may be a value or set of values indicating a type of relationship may, such as stranger, acquaintance, friend, co-worker, or family Thus, it is contemplated that in some embodiments, the categories of social proximity are not mutually exclusive; for instance, two co-workers might also be family members or close friends. In one embodiment, for instance, the attendee proximity score may be a vector having a set of values for dimensions each representing a type of relationship. An attendee proximity score may be determined from information in relational profiles, which may be in the form of a database or vector, for each meeting attendee, including the user. The relational profiles may include information about each meeting attendee as well as information about relationships between attendees.

From the relational profiles, information about the attendees' historical interactions, including information about past electronic communications and, in some embodiments, past meetings may be determined. For instance, in some aspects, the frequency with which the attendees have communicated, the modes of communication (e.g., email, text messaging, instant messaging, voice calls, video calls, social media communications), and/or the topics of communication may be determined. Additionally, in some embodiments, the frequency with which the attendees meet, the venues and locations of meetings between attendees, and the topics of the meetings, may also be determined. The relational profiles may also be compared or mapped to identify commonalities among the attendees, such as common interests, common work product, common work title, and common acquaintances, social connections, or contacts, for example. For instance, it may be determined that attendees are associated with the same domain belonging to an employer and that the attendees have at least ten common social contacts on a social media platform.

This information determined from the relational profiles may be utilized to determine and assign an attendee proximity score for a group, such as a pair, of attendees. In some embodiments, a vector representing a group, such as a pair, of attendees is created using the information from the relational profiles such that the elements or dimensions of the vector have values representing a connection (or connection type or dimension, or a degree of connection) between attendees within the group. A heuristic technique, which may comprise a supervised or unsupervised machine learning technique (or combination of machine-learning techniques), may be utilized to determine the attendee proximity information for that group. In one embodiment, for instance, an unsupervised clustering technique is utilized. For example, a frequency of electronic communications indicating that two attendees communicate on a daily basis via a chat messaging application may be utilized to determine that the two attendees are close acquaintances, while a frequency indicating the attendees have only communicated once via email may be utilized to determine the attendees are strangers. In another example, having a common domain belonging to an employer (which is an example of another connection type or connection dimension) may indicate that the attendees are co-workers. An attendee proximity score may be determined for each group of attendees associated with a particular meeting. In example embodiments, an attendee proximity score is determined for pairs of attendees with each pair including the user of the electronic schedule for which the proximity score is being determined. In some embodiments, an attendee proximity score is also determined for any pair of attendees that does not include the user.

Based on the attendee proximity scores determined for a meeting, a meeting proximity score may be determined. A meeting proximity score indicates an overall or prevailing social proximity of attendees of the meeting. Where only one attendee proximity score is determined for a meeting, such as when there are only two attendees, the meeting proximity score may be determined from that one attendee proximity score. In other instances where there are multiple attendee proximity scores determined for a meeting, the attendee proximity scores may be combined to determine the meeting proximity score. In some examples, combining the attendee proximity scores may be done by applying a set of Boolean rules to resolve conflicting attendee proximity scores. In other embodiments, attendee proximity scores may be weighted, based on rules, conditions, user preferences, or user history, such that certain attendee proximity scores influence the resulting meeting proximity score more than other attendee proximity scores. For example, in one embodiment a combination of rules and/or other logic (such as machine learning techniques described below) may specify using only the attendee proximity score(s) of the user and the organizer of the meeting to determine the meeting proximity score, or assigning more weight to the attendee proximity score(s) of the user and meeting organizer. In yet other example embodiments, a machine learning technique, such as clustering, decision tree (or random forest), neural network, or other classifier or statistical pattern analysis may be utilized to determine the meeting proximity scores. Further, in other embodiments, the meeting proximity score may be determined in accordance with a mathematical calculation, such as summing or averaging the attendee proximity scores.

The meeting proximity score may be provided to a computing application or service, such as an electronic scheduling application or related service, or may be provided as an API to facilitate consumption of the determined meeting proximity score by an application or service. For instance, in some embodiments, a proximity indicator for the meeting is generated based on the determined meeting proximity score for use within a scheduling application. The proximity indicator is a perceptible marker, such as a visual or audio marker, of a meeting's overall proximity score. For instance, a color may be associated with different meeting proximity scores, and, based on a meeting's meeting proximity score, at least part of the graphic interface component for the meeting may presented as the associated color. In other aspects, the proximity indicator is a symbol added to the graphic interface component for the meeting. In further aspects, the proximity indicator is a position within a ranking of other meetings to be presented to the user.

A proximity indicator may be generated for each meeting within the user's electronic schedule or within a subset of the electronic schedule. These proximity indicators for the meetings may be provided to the user in a calendar view or list view, such as by color coding the individual meetings in accordance with the meeting proximity score. Presenting the proximity indicators provides context to the user's electronic schedule while requiring little to no additional display area, thereby enabling this type of information to be conveyed for more meetings contemporaneously on limited screen space. In this way, embodiments of the disclosed technology convey information about the attendees without requiring the user to open up each individual meeting to see the attendees and, thus, reduces the amount of processing power consumed when providing this type of information to a user. Additionally, the proximity indicators may be utilized to sort or filter meetings in a user's electronic schedule based on attendees, which improves upon conventional scheduling technology that does not have this capability.

Further, the determined meeting proximity scores may be utilized to suggest meetings to reschedule. For instance, if a user needs to schedule a meeting within a future time period during which multiple meetings are already scheduled, one or more of the already-scheduled meetings may be determined and presented to the user as a potential meeting to reschedule to allow time for the new meeting at least partly based on the meeting proximity scores for the already-scheduled meetings. A suggestion for rescheduling meetings may also be automatically provided when an existing conflict is detected between multiple scheduled or tentative meetings within the user's electronic schedule. In other aspects, the meeting proximity scores may be utilized to make suggestions for other meeting attributes, such as time/date, venue, or location, when a user is creating a meeting invitation to other attendees.

Turning now to FIG. 1, a block diagram is provided showing an example operating environment 100 in which some embodiments of the present disclosure may be employed. It should be understood that this arrangement and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; sensors 103*a* and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 6 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, or any combination of these delineated devices, or any other suitable computer device.

Data sources 104*a* and 104*b* through 104*n* may comprise data sources and/or data systems, which are configured to make data available to any of the various constituents of operating environment 100, or system 200 described in connection to FIG. 2. (For instance, in one embodiment, one or more data sources 104*a* through 104*n* provide (or make available for accessing) user data, which may include user-activity related data, to user-data collection component 210 of FIG. 2.) Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* through 104*n* comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
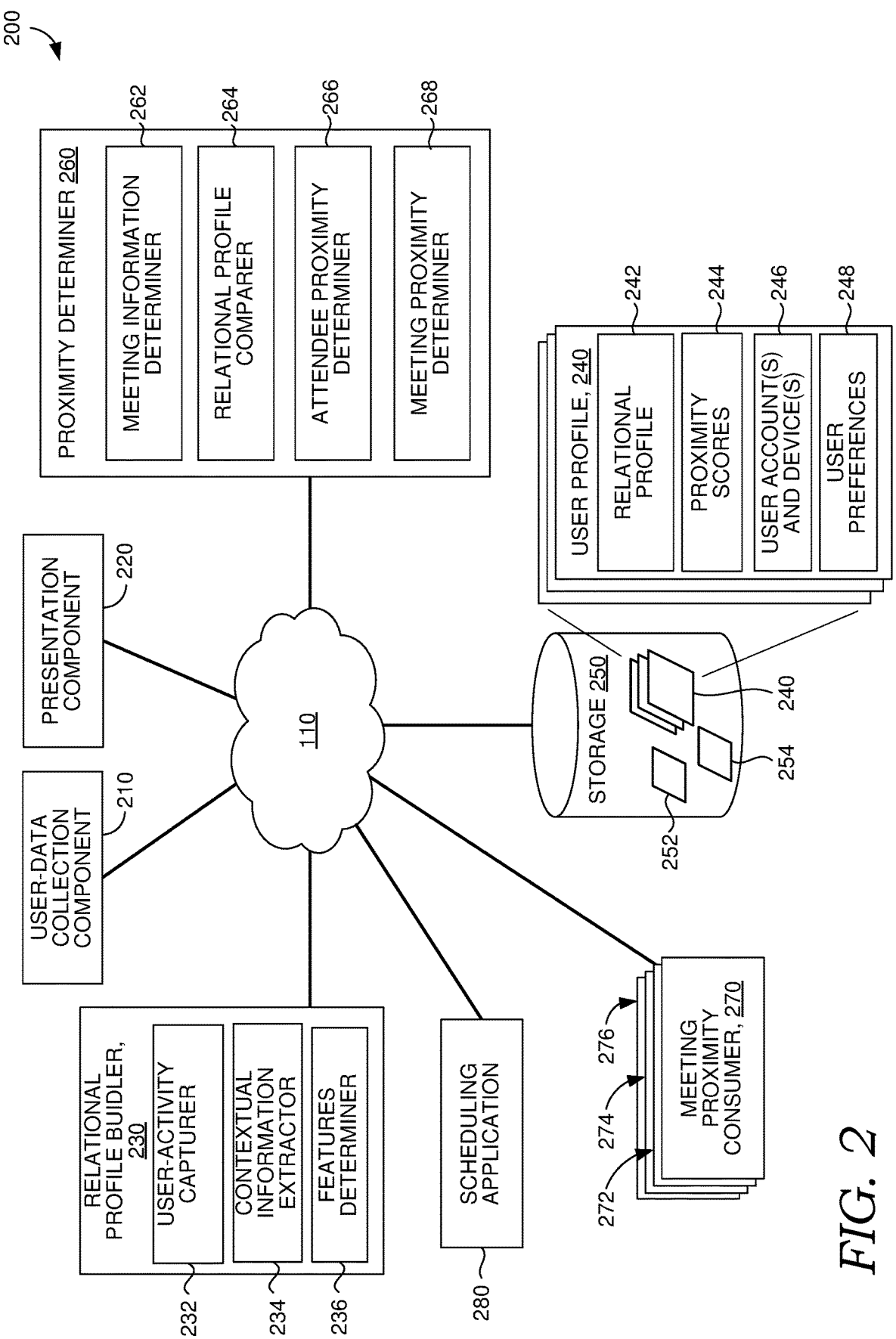
FIG. 2 is a diagram depicting an example computing architecture suitable for implementing aspects of the present disclosure.

Operating environment 100 can be utilized to implement one or more of the components of system 200, described in FIG. 2, including components for collecting user-related data; determining attendee proximity scores, determining meeting proximity scores, and consuming meting proximity scores by, for instance, generating proximity score indicators for visual or audio presentation, filtering meetings in an electronic schedule, and/or facilitate rescheduling meetings. Operating environment 100 also can be utilized for implementing aspects of methods 300 and 400, described in in FIGS. 3 and 4, respectively.

Referring now to FIG. 2 and with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1 and which communicatively couples components of system 200 including user-data collection component 210, presentation component 220, relational profile builder 230, proximity determiner 260, meeting proximity consumer(s) 270, scheduling application 280, and storage 250. One or more of these components may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more electronic scheduling applications, services, or routines (such as scheduling application 280). In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and, in some cases, also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for relational profile builder 230. The data may be received (or accessed), and optionally accumulated, reformatted, and/or combined, by user-data collection component 210 and stored in one or more data stores such as storage 250, where it may be available to other components of system 200. For example, the user data may be stored in or associated with a user profile 240, as described herein. Additionally or alternatively, in some embodiments, any personally identifying data (i.e., user data that specifically identifies particular users) is either not uploaded or otherwise provided from the one or more data sources with user data, is not permanently stored, and/or is not made available to some components of system 200. In some embodiments, a user may opt into or out of services provided by the technologies described herein and/or select which user data and/or which sources of user data are to be captured and utilized by these technologies.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location (e.g., geo or absolute location or relative location) and/or venue information of mobile device(s); properties or characteristics of the user device(s) (such as device state, charging data, date/time, or other information derived from a user device such as a mobile device); user-activity information (for example: app usage; online activity; searches; voice data such as automatic speech recognition; activity logs; communications data including calls, texts, instant messages, and emails; website posts; other user data associated with communication events; or other user data) including, in some embodiments, user activity that occurs over more than one user device; user history; session logs; application data; contacts data; calendar and schedule data; notification data; social media data (including social media interactions and connections); news (including popular or trending items on search engines or social networks); online gaming data; ecommerce activity (including data from online accounts such as Microsoft®, Amazon®, Google®, eBay®, PayPal®, video-streaming services, gaming services, or Xbox Live®); user-account(s) data (which may include data from user preferences or settings associated with a personal assistant application or service); home-sensor data; appliance data; global positioning system (GPS) data; vehicle signal data;

traffic data; weather data (including forecasts); wearable device data; other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)); gyroscope data, accelerometer data; payment or credit card usage data (which may include information from a user's PayPal® account); purchase history data (such as information from a user's Xbox Live®, Amazon®, or eBay® account); other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components); data derived based on other data (for example, location data that can be derived from Wi-Fi, Cellular network, or IP address data); and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

Relational profile builder 230 is generally responsible for collecting relational information associated with a user to be used to determine a social proximity between individuals, such as the user and other meeting attendees. For example, embodiments of relational profile builder 230 may receive information about user activity that includes information about other user/individuals, such as electronic communications and other interactions between the user and other individuals. Accordingly, embodiments of relational profile builder 230 may determine, based on information from user-data collection component 210, user activity associated with a particular user, which may include user activity involving other users. As described previously, the user activity information determined by relational profile builder 230 may include user activity information from multiple user devices associated with the user and/or from cloud-based services associated with the user (such as email, calendars, instant messaging, file storage, social media, or similar information sources), and may include contextual information associated with the identified user activity. Relational profile builder 230 may determine current or near-real-time user activity information and, in some embodiments, may also determine historical user activity information, which may be determined based on gathering observations of user activity over time by accessing user logs of past activity (such as browsing history or archived emails, for example). Further, in some embodiments, relational profile builder 230 may determine user activity (which may include historical activity) from other similar users (i.e., crowdsourcing), as described previously.

In some embodiments, information determined by relational profile builder 230 may be stored as a relational profile associated with a user, such as relational profile 242 in user profile 240, and also may be provided to proximity determiner 260. As such, relational profile builder 230 may identify information pertaining to interactions with other users, such as communications and meetings or other information (such as, for instance, social media connections, demographic information, employment history, education information, hobbies, interests, or other associated entities) that may be utilized to identify commonalities and/or infer relationship information between the user and other meeting attendees.

In an embodiment, relational profile builder 230 comprises one or more applications or services that analyze information detected via one or more user devices used by the user and/or cloud-based services associated with the user, to determine relational information and related contextual information. Information about user devices associated with a user may be determined from the user data made available via user-data collection component 210, and may be provided to relational profile builder 230, proximity determiner 260, or other components of system 200.

More specifically, in some implementations of relational profile builder 230, a user device may be identified by detecting and analyzing characteristics of the user device, such as device hardware, software such as operating system (OS), network-related characteristics, user accounts accessed via the device, and similar characteristics. For example, information about a user device may be determined using the functionality of many operating systems to provide information about the hardware, OS version, network connection information, installed application, or the like.

Some embodiments of relational profile builder 230, or its subcomponents, may determine a device name or identification (device ID) for each device associated with a user. This information about the identified user devices associated with a user may be stored in a user profile associated with the user, such as in user accounts and devices 246 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by relational profile builder 230. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As shown in example system 200, relational profile builder 230 comprises a user-activity capturer 232, a contextual information extractor 234, and a features determiner 236. In some embodiments, relational profile builder 230, one or more of its subcomponents, or other components of system 200 may determine interpretive data from received user data. Interpretive data corresponds to data utilized by these components of system 200 or subcomponents of relational profile builder 230 to interpret user data. For example, interpretive data can be used to provide other context to user data, which can support determinations or inferences made by the components or subcomponents. Moreover, it is contemplated that embodiments of relational profile builder 230, its subcomponents, and other components of system 200 may use user data alone or in combination with interpretive data for carrying out the objectives of the subcomponents described herein. Additionally, although several examples of how relational profile builder 230 and its subcomponents may identify relational information are described herein, many variations of relational information identification and observation are possible in various embodiments of the disclosure.

User-activity capturer 232 is generally responsible for capturing user activity, including interactions among users, such as the user and another meeting attendee. For instance, embodiments of user-activity capturer 232 may determine or receive information about electronic communications between users (such as text messages, emails, and instant messages, social media communications, voice calls, and video calls) and scheduled meetings between users. Embodiments of user-activity capturer 232 also may be used for determining current interactions in real time or near real time or one or more historical user actions. Some embodiments of user-activity capturer 232 may observe user data for activity-related features or variables corresponding to user activity, such as indications of applications launched or accessed, files accessed, modified, copied, or other application-related activity, websites navigated to, online content downloaded and rendered or played, or similar user activities.

Additionally, some embodiments of user-activity capturer 232 extract, from the user data, information about user activity, which may include current user activity, historical user activity, and/or related information such as contextual information. (Alternatively or in addition, in some embodiments, contextual information extractor 234 determines and extracts contextual information. Similarly, in some embodiments, features determiner 236 extracts information about user activity, such as user-activity related features, based on an identification of the activity determined by user-activity capturer 232.) Examples of extracted user activity information may include online activity, searches, calls, usage duration, application data (e.g., emails, messages, posts, user status, notifications, or other application data), or nearly any other data related to interactions with the user device or user activity via a user device. User-activity capturer 232 may also extract the content (such as textual content or audio content from user speech) within the electronic communications.

User-activity capturer 232 may further extract information about entities associated with captured user activity. These entities may then be associated with the user. For instance, in some embodiments, user-activity capturer 232 identifies a user's demographic information; hobbies and interests; employment information, such as occupation, employer, and job title; education information, such as educational institutions attendees, degrees or certificates earned, and years of completion; social media connections, such as friends, followers, links or other connections between social media accounts; or other affiliations, such as places lived and organizations supported, and the like. This information may be extracted by user-activity capturer 232 in relation to a user interaction directly or indirectly involving that entity. Some embodiments of user-activity capturer 232 may extract this information from the user data information, which may include current user activity, historical user activity, and/or related information such as contextual information. For example, user-activity capturer 232 may identify another person as an associated entity for a user when user activity data includes the user "following" an account of the other person on a social media platform. As another example, user-activity capturer 232 may identify a business as being associated with the user when the user sends and receives emails with an email domain belonging to or used by the business. (Alternatively or in addition, in some embodiments, contextual information extractor 234 determines and extracts this contextual information.)

Among other components of system 200, the extracted user activity information determined by user-activity capturer 232 may be provided to other subcomponents of relational profile builder 230 or proximity determiner 260. For example, the user activity information may be used by proximity determiner 260 to determine the frequency and mode of communications between users. Further, the extracted user activity may be stored as relational profile information in a user profile associated with the user, such as relational profile 242 of user profile 240. (In some embodiments, user-activity capturer 232 (or another subcomponent of relational profile builder 230) performs conflation on the detected user activity information. For example, overlapping information may be merged and duplicated or redundant information eliminated.)

In some embodiments, user-activity capturer 232 runs on or in association with each user device for a user. User-activity capturer 232 may include functionality that polls or analyzes aspects of the operating system to determine user activity related features (such as installed or running applications or file accesses and modifications, for example), network communications, and/or other user actions detectable via the user device including sequences of actions.

Contextual information extractor 234, in general, is responsible for determining contextual information related to the user activity (detected by user-activity capturer 232 and/or relational profile builder 230). This contextual information may include context features or variables associated with user activity and related information. Contextual information extractor 234 may further be responsible for associating the determined contextual information with the detected user activity or user-associated entities. For example, contextual information extractor 234 may, in some embodiments, determine context of communications (e.g., email), meetings, or other interactions between users and determine contextual data about the user interactions, which may be provided to one or more components of relational profile builder 230 and proximity determiner 260.

In some embodiments, contextual information extractor 234 may associate the determined contextual information with the related user activity or connection and may also log the contextual information with the associated user activity or connection. Alternatively, the association or logging may be carried out by another service. For example, some embodiments of contextual information extractor 234 may provide the determined contextual information to features determiner 236, which determines features of the user activity, user connection, and/or related contextual information.

Some embodiments of contextual information extractor 234 determine contextual information related to user activity, such as entities identified in a user activity or related to the activity (e.g., the recipient of an email, a proposed venue or location for a scheduled meeting) or a location or venue of the user device, when user activity is detected, such as the location of the user device during a time coinciding with a scheduled meeting or activity. By way of example and not limitation, this may include context features such as location data (e.g., geo/absolute location or relative location), which may be represented as a location stamp associated with the activity; contextual information about the location, such as venue information (e.g., this is the user's office location, home location, school, restaurant, movie theater), yellow pages identifier (YPID) information, time, day, and/or date, which may be represented as a time stamp associated with the activity; user device characteristics or user device identification information regarding the device on which the user carried out the activity; duration of the user activity, other user activity/activities preceding and/or following the user activity; other information about the activity such as entities associated with the activity (e.g., people, objects, topics, venues); information detected by sensor(s) on user devices associated with the user that is concurrent or substantially concurrent to the user activity (e.g., motion information or physiological information detected on a fitness tracking user device, listening to music, which may be detected via a microphone sensor if the source of the music is not a user device), or any other information related to the user activity that is detectable that may be used for determining a social proximity of the user with another user, such as another meeting attendee, as described below. For example, contextual information extractor 234 may determine information directly related the mode of communication used, the subject of any scheduled meetings and/or communications between the users, and the like.

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user as previously described with respect to relational profile builder 230.

In some implementations, contextual information extractor 234 may receive user data from user-data collection component 210, parse the data, in some instances, and identify and extract context features or variables (which may also be carried out by features determiner 236). Context features may be stored as a related set of contextual information associated with the user activity and may be stored in a user profile such as in relational profile 242. In some embodiments, the user activity information determined by relational profile builder 230, such as features of user activity (which may include context features), are used by attendee proximity determiner 266 as described herein. In some instances, analyzed features corresponding to these entities (or corresponding to other user activity features) may be weighted according to the frequency, amount of time, and/or recency (i.e., the "freshness" of the activity, which may be used for a decaying weighting, with more recent activity receiving a higher weight than "stale" activity that occurred farther in the past) that these topics or entities (or the other user activity features) occur in the user activity.

As mentioned, features determiner 236 may determine features for user activity information determined by user-activity capturer 232 and user-connection capturer 234 as well as contextual information extracted from contextual information extractor 234. In an example embodiment, features determiner 236 determines features relating to interactions between users. Interactions between users may be in the form of electronic communications that include, for example and without limitation, email; text messages; instant message, including group chats; social media communications, which may include tags, likes, comments, and comments to tweets, posts, snaps, picture-grams, and other shared-media communications; voice calls; video calls; mixed-media messages; and similar electronic communication formats. Interactions may also include meetings, which may be scheduled in one or more users' scheduling application, such as scheduling application 280, or referenced in one of the above forms of communications. As such, features determined by one embodiment of features determiner 236 may include, without limitation, information about communication recipients (including recipient categories for those the communication was sent directly to, those who were be copied, or frequency or patterns of communications to a recipient); date/time a communication was sent; information derived from the content of the communication, which may include a message subject line or body of a communication (e.g., references to other communications or interactions or common interests and/or traits), as well as information about the user, user-related activity, or other contextual information.

Continuing with system 200 of FIG. 2, proximity determiner 260 is generally responsible for determining a proximity indication, such as a proximity score, for meetings in a user's electronic schedule. An embodiment of proximity determiner 260, at a high level, utilizes information in relational profiles of meeting attendees to determine a proximity score for a meeting. In example aspects, proximity determiner 260 determines one or more attendee proximity scores specific for groups of attendees of the meeting and then determines a meeting proximity score based on the attendee proximity score(s) for a particular meeting. For instance, in an embodiment shown in FIG. 2, proximity determiner 260 includes meeting information determiner 262, relational profile comparer 264, attendee proximity determiner 266, and meeting proximity determiner 268. In some embodiments, the components of proximity determiner 260 may run on a client computing device, on a server, as a distributed application across multiple devices, or in the cloud.

Meeting information determiner 262 is generally responsible for identifying information about a meeting that is needed to assign a proximity to the meeting. As used herein, a meeting may be an arranged assembly of individuals (attendees). A meeting may refer to an assembly of the attendees to discuss a particular topic or accomplish a particular goal, such as a meeting between co-workers or an appointment between with a service provider; however, a meeting may also be a social gathering or event. Additionally, a meeting may occur online (e.g., through an online meetings application or online voice call) or offline (e.g., telephone call or in-person meeting). A meeting for which information is determined may be a scheduled meeting event, a tentative meeting event, a proposed meeting event, or a draft meeting invitation in a user's electronic scheduling application, such as scheduling application 280. As such, in example embodiments, meeting information determiner 262 retrieves or otherwise receives information about a meeting from scheduling application 280.

In exemplary embodiments, the information determined by the meeting information determiner 262 includes identifiers, such as user names, of the meeting attendees. In some embodiments, this information identifies the meeting attendees entered into an attendee field of an electronic meeting event or are otherwise identified within or by the electronic meeting event as being an attendee or potential attendee. In some embodiments, the attendees may be identified in the subject line or body of a meeting event or invitation. For instance, the meeting attendees for a meeting event on a user's electronic schedule with the subject line of "Appointment with Dr. Lena Gupta" may be identified as including the user and Dr. Lena Gupta.

The attendees identified by the meeting information determiner 262 may not include all attendees of the actual meeting. For instance, there may a large group of people actually attending a meeting, but the meeting event on the electronic schedule may identify only a portion of those people; in this case, the people not included within the electronic meeting event may not be identified by meeting information determiner 262. It is also contemplated that, in some embodiments, meeting information determiner 262 may determine information on only a portion of attendees that are included in the electronic meeting event.

In some embodiments of meeting information determiner 262, a role associated with the attendee for that meeting, such as whether the attendee is a required or optional and/or whether the attendee created the meeting, accepted an invitation for the meeting, tentatively accepted an invitation for the meeting, or declined an invitation for the meeting, is determined. Additionally, meeting information determiner 262 may also determine other information about the meeting not directly related to the attendees, such as the date and time of the meeting, the venue (e.g., a restaurant, an office, the user's home), the location (which may include whether the meeting is online or offline), the subject or title, and any accompanying content, such as information in the body of a meeting event or invitation or files attached to the meeting event or invitation.

Relational profile comparer 264 is generally responsible for determining commonalities among meeting attendees based on relational profile information. The relational profile information may be received directly from relational profile builder 230 or may be stored in relational profiles 244 for each meeting attendee. In example embodiments, commonalities comprise in-common features that are determined by the features determiner 236. Commonalities may include, for example and without limitation, common social media connections, common demographic information, a common domain (which may include an employer or company, an occupation, interest, or location), common education information, and common affiliated organizations. For example, two meeting attendees may be determined, based on their respective relational profiles, to golf and be associated with the same university. Another pair of meeting attendees may be determined to live in the same city, have 120 common "friends" on a social media platform, support the same charitable organization, and frequently shop at the same stores.

In some embodiments, relational profile data for meeting attendees is stored or otherwise provided in the form of a multi-dimensional vector with dimensions representing characteristics or features of various entities (such as, for instance, organizations, businesses, concepts/activities, locations, people) that may or may not be associated with the attendee. Commonalities among meeting attendees may be identified by comparing vectors for each meeting attendee to determine how similar the vectors are. Relational profile information for meeting attendees may be stored within a graph data store having nodes representing each meeting attendee and being connected, via edges, to associated entities, and wherein commonalities among meeting attendees are determined by identifying common entities connected to each node representing a meeting attendee.

Attendee proximity determiner 266 is generally responsible for determining attendee proximity scores for groups of attendees associated with a meeting. Because the attendee proximity score is a measure of a social proximity or relationship among individuals, a group for which an attendee proximity score is determined includes at least two attendees. In exemplary aspects, a group is a pair such that each proximity score determined by attendee proximity determiner 266 represents a social proximity between two meeting attendees. In other aspects, attendee proximity determiner 266 determines attendee proximity scores for groups larger than two. The number of attendees for which a given attendee proximity score is determined may be fixed such that the number is the same regardless of how many meeting attendees there are in total for one meeting. Alternatively, the number of attendees for which an attendee proximity score is determined may be variable based on the total number of attendees, such as when the number of attendees for an attendee proximity score is set to equal the total number of attendees for that meeting.

For each group of attendees, the attendee proximity determiner 266 may determine an attendee proximity score based on relational profile information of attendees within the group. The relational profile information utilized for determining the attendee proximity score may include an interaction pattern and commonalities among the meeting attendees. Commonalities among meeting attendees used to determine an attendee proximity score, for instance, may be determined by relational profile comparer 264 using relational profile information as explained above. Interaction patterns between meeting attendees may also be determined using relational profile information retrieved or otherwise received from stored user profiles of each meeting attendee, such as user profile 240 in storage 250. An interaction pattern may include a frequency of communication, channels of communication (e.g., text, instant message, voice call, video call, email, or other channels of communication), and topics of communication. For instance, relational profile information of a meeting attendee may indicate an interaction pattern with another meeting attendee involving daily emails pertaining to work-related topics and between one to four text messages every few months pertaining to work-related topics. Interaction patterns may also include interactions between meeting attendees on social media platforms. For instance, interaction patterns may indicate whether meeting attendees are connected (i.e., are friends, followers, or linked) on social media platforms, a frequency with which the meeting attendees interact with one another's social medial website account, and the manner of the interactions (e.g. like, react, tag, message, or other manners or ways users may interact.).

In example embodiments, the attendee proximity score is determined by attendee proximity determiner 266 based on attendee interaction patterns and identified commonalities among meeting attendees utilizing attendee proximity logic 252 in storage 250. Attendee proximity logic 252 includes rules, conditions, associations, machine learning models, or other criteria for inferring a degree of social proximity or type of relationship among meeting attendees based on relational profile information of the attendees. Attendee proximity logic 252 may take different forms depending on the mechanism(s) used to determine the attendee proximity. For instance, in one embodiment, one or more classifiers may be utilized to classify attendee interaction patterns and identified commonalities among meeting attendees into a particular social proximity, which may include a degree of social closeness and/or type of relationship. Further, multiple classifiers may be utilized with each classifier outputting a prediction of the meeting attendees having a social proximity for that particular classifier. In some embodiments, attendee proximity logic 252 may comprise fuzzy logic, neural network(s), finite state machine, support vector machine, logistic regression, clustering, or other machine-learning techniques, similar statistical classification processes, or combinations of these to determine the likely social proximity or type of relationship among meeting attendees.

In some embodiments, determining the attendee proximity score includes generating a vector for the group of attendees based on the relational profile information for the attendees. The dimensions (also referred to as elements) of the vector may correspond to features (for a single dimension vector) or categories of features (for a multiple dimensional vectors) with each dimension having a value representing a connection (or connection type or dimension, or a degree of connection) between attendees within the group. The values of the dimensions may, for instance, indicate the presence (or lack thereof) of various interaction information or commonalities between attendees. Alternatively, each dimension may include a value indicating a degree, magnitude or other information about the respective feature.

Attendee proximity logic 252 may output a proximity score indicating the likely social closeness or type of relationship among meeting attendees and, in some aspects, the output proximity score is based on a vector generated for the group of attendees. For example, an attendee proximity score indicating a social proximity may be a value or set of values (numerical or categorical) indicating a degree of closeness, such as very close, somewhat close, or not close. Alternatively or additionally, an attendee proximity score may be a value or set of values indicating a type of relationship, such as stranger, acquaintance, friend, peer, co-worker, or family In some embodiments, the attendee proximity score indicates both a degree of closeness and type of relationship, such as a close co-worker. For instance, utilizing attendee proximity logic 252, attendee proximity determiner 266 may determine two attendees are "close" based at least on an interaction pattern of multiple communications per day via a chat messaging application and having over 50 common social media connections; whereas, attendee proximity determiner 266 may determine attendees who have only communicated twice via email to be "not close". In another embodiment, attendee proximity determine 266 may determine two attendees are "co-workers" when relational profile information shows the two attendees have a common domain belonging to an employer and communicate frequently during business hours over email but do not frequent communicate via text. In another example, attendee proximity determine 266 may determine two attendees are "family" when relational profile information shows the attendees communicate every day via text message and/or voice calls, have over 100 social media connections in common and frequently interact with each over via social media, both spend large amounts of time outside of business hours at the same address.

In example embodiments, the output attendee proximity score comprises a vector with dimensions each representing a category or range of social proximity. Each dimension may have a value representing a likelihood of the attendees having the particular type of relationship represented by the dimension. For example, an attendee proximity score in the form of a vector may have a 0.10 for a "friendness" dimension, a 0.89 for a "close-colleagenuess" dimension, a 0.02 for a "familyness" dimension, and a 0.12 for a "strangerness" dimension. Because types of relationships may not be mutually exclusive (e.g., a family member may also be a colleague), an attendee proximity score in the form of a vector may be useful to accurately indicate the social proximity between the attendees.

Attendee proximity logic 252 may also output a confidence score (also referred to as an attendee proximity confidence score) associated with each determined likelihood of meeting attendees having a particular social proximity. In some embodiments, only attendee proximities satisfying (e.g., meeting or exceeding) a predefined confidence score (e.g., 80% or higher) are output. In some aspects, the attendee proximity score comprises a vector with dimensions representing different degrees of closeness and/or types of relationships, and confidence scores for each degree or type can be utilized as values for the dimensions of the vector.

The determined attendee proximity score, as well as any associated confidence score, for a group of attendees may be stored in one or more user profiles associated with the attendees. For instance, the determined proximity score for a group made up of two attendees may be stored in user profiles for each of the two attendees, as shown as proximity scores 244 in user profile 240.

In some embodiments where attendee proximity scores for a group of attendees been previously determined and stored, attendee proximity determiner 266 determines attendee proximity scores for a group of attendees of a particular meeting by retrieving or otherwise receiving the stored attendee proximity score from an attendee's user profile, such as user profile 240. In some aspects, attendee proximity determiner 266 first determines whether there are any stored attendee proximity scores for one or more groups of the attendees and determines new attendee proximity scores for any groups in which attendee proximity scores have not been stored. Further, in some embodiments, even where an attendee proximity score for a group was previously determined and stored, attendee proximity determiner 266 may determine a new attendee proximity score or update an old score upon determining that the stored attendee proximity score had not been updated within a predetermined threshold period of time, such as six months or one year for example.

As previously mentioned, attendee proximity scores are determined for groups of attendees associated with the meeting, and scores for multiple groups may be determined for a single meeting. In some embodiments, assignment of a proximity to a meeting is performed in connection with a particular user's electronic schedule, and the groups for which an attendee proximity score is determined all include the particular user whose electronic schedule has the meeting event. For instance, when determining a social proximity for a meeting on Daniel's schedule with the meeting attendees being Daniel, Meredith, and Julie, attendee proximity determiner 266 may determine attendee proximity scores for Daniel and Meredith and for Daniel and Julie, but not for Meredith in Julie. In other embodiments, attendee proximity scores are determined for all possible groups for which information is available, such that, in the above example, an attendee proximity score for Meredith and Julie would also be determined. Further, in some embodiments, attendee proximity scores are determined for groups not including the particular user of the electronic schedule only to the extent that relational information between other attendees can be determined from information that is publicly available or otherwise accessible to the particular user, such as information from the user's own historical interaction data or available to the user through social media platforms. For instance, in the above example, an attendee proximity score for Meredith and Julie may be determined only to the extent indicated in information that is publicly available or otherwise available to Daniel, such as information about past communications and interactions between Daniel, Meredith, and Julie and information about social media interactions between Meredith and Julie that are accessible by Daniel.

Meeting proximity determiner 268 is generally responsible for determining an overall proximity score for a meeting. The meeting proximity score may be an indication of an overall or prevailing social proximity among meeting attendees. Meeting proximity determiner 268 determines the meeting proximity score based on the attendee proximity scores determined for the meeting as described above with respect to attendee proximity determiner 266. For meetings in which only one attendee proximity score is determined, such as for a meeting between only two attendees, the meeting proximity score may be equal to or directly proportionate to the one attendee proximity score. In some embodiments, meeting proximity determiner 268 determines a meeting proximity score for a meeting directly from relational profile information, rather than from attendee proximity scores. Where there are multiple attendee proximity scores, the attendee proximity scores may need to be combined and/or conflicts between scores may need to be resolved in order to determine the meeting attendee proximity score.

Meeting proximity determiner 268 utilizes meeting proximity logic 254 in storage 250 to determine the meeting proximity score based on attendee proximity scores determined for groups of meeting attendees. Meeting proximity logic 254 includes rules, conditions, associations, machine learning models, or other criteria for inferring an overall or prevailing social proximity (e.g., degree of closeness or type of relationship) among meeting attendees based on attendee proximity scores for groups, such as pairs, of attendees. Meeting proximity logic 254 may take different forms depending on the mechanism(s) used to determine the meeting proximity, and in some embodiments, meeting proximity logic 254 may be in the same form as attendee proximity logic 252. In some embodiments, attendee proximity logic 252 may comprise fuzzy logic, neural network (s), finite state machine, support vector machine, logistic regression, clustering, or other machine-learning techniques, similar statistical classification processes, or combinations of these. In one example embodiment, a clustering technique is utilized to assign a degree of proximity or type of relationship to a particular meeting. In another example, a set of Boolean rules are utilized to determine the overall meeting proximity, which may include resolving conflicting attendee proximity scores. For instance, a rule may be utilized to apply a meeting a proximity score that matches a proximity score shared by over 50% of the groups of attendees in the meeting and, otherwise, apply the highest attendee proximity score. In some aspects, the set of Boolean rules are specific to how the meeting proximity score is being consumed (described with respect to meeting proximity consumer 270). In other aspects, attendee proximity scores for different groups of attendees for a meeting may be mathematically combined, such as by summing or averaging the attendee proximity scores, to determine the overall meeting proximity score. In some embodiments, attendee proximity scores may be weighted, based on rules, conditions, user preferences, or user history, such that certain attendee proximity scores influence the resulting meeting proximity score more than other attendee proximity scores.

Although many embodiments are described herein as making determinations of a meeting proximity score based on information for each attendee, it is also contemplated that some embodiments may utilize information from only a portion of meeting attendees. For example, relational profiles may be utilized for a portion, but not all, of meeting attendees, such as for those attendees for whom a relational profile is available. Similarly, an attendee proximity score and/or meeting proximity score may be determined using information about a portion of the attendees of a meeting.

The types of meeting proximity scores output by meeting proximity logic 254 may be similar to the types of attendee proximity scores disclosed with respect to attendee proximity logic 252. Meeting proximity logic 254 may also output a confidence score (also referred to as a meeting proximity confidence score) associated with a determined meeting proximity (e.g., prevailing degree of social closeness and/or type of relationship). In some embodiments, only meeting proximity scores satisfying (e.g., meeting or exceeding) a predefined confidence score (e.g., 80% or higher) are output and consumed in accordance with meeting proximity consumer 270. The determined meeting proximity score, as well as any associated confidence score, for a meeting may be stored in association with the meeting, such as in storage 250.

Continuing with FIG. 2, example system 200 also includes one or more meeting proximity consumers 270. Meeting proximity consumers 270 comprise computing applications or computing services that consume the determined meeting proximity information (e.g., meeting proximity scores) to provide an improved computing experience for the user when scheduling meetings and/or managing a user's electronic schedule. As described herein, meeting proximity scores reflecting inferences made about relationships among meeting attendees may be provided to computer applications or services (e.g., meeting proximity consumers 270), which may include an aspect of a virtual assistant computer program associated with the user. In some embodiments, the coherent prediction(s) may be provided in connection with an API to facilitate their utilization by a meeting proximity consumer 270. Examples of meeting proximity consumers 270 may include, without limitation, calendar or scheduling applications or services, notification services, personalized content services, automation services, or other computing services that may be tailored to a user based on inferences made about relationships between the user and other meeting attendees (e.g., meeting proximity scores). Some embodiments of meeting proximity consumers 270 may be carried out by a virtual assistant application or service, which may be implemented as one or more computer programs (which may comprise one or more applications, services, or routines), such as an app running on a mobile device and/or in the cloud, as further described herein.

In particular, one example of a meeting proximity consumer 270 comprises a meeting coding service 272 that facilitates management and organization of the user's electronic schedule. Thus, meeting coding service 272 may be considered one example of an application or service (or set of applications or services) that may consume information about proximity scores for meetings as determined by implementations of the present disclosure. As a high level, meeting coding service 272 is generally responsible for generating perceptible indicators of proximity for meetings in an electronic schedule based on the determined meeting proximity scores. A proximity indicator is a perceptible marker, such as a visual or audio marker, of the meeting proximity score. In some embodiments, for example, meeting coding service 272 may apply a color associated with the determined meeting proximity score to the graphic interface component for the meeting. For instance, where meeting proximity scores include "no acquaintance/distant", "acquaintance", "close friend or family", meeting coding service 272 may cause presentation component 220 to provide graphic user interface components for each meeting with a meeting proximity score of "no acquaintance/distant" as a red color, each meeting with a meeting proximity score of "acquaintance" as a yellow color, and each meeting with a proximity score of "close friend or family" as a green color. The color may be applied to an entire displayed interface component for the meeting event or may be applied to only a portion of the interface component for the meeting event. In some embodiments, each distinct category of the meeting proximity score is associated with a different color; whereas, in other embodiments, multiple categories may be assigned the same color. In some aspects, different intensities of the same color, rather than different colors, are utilized to represent different meeting proximity scores. In some aspects, meeting coding service 272 may apply a gradient color scale or gradient intensity scale for assigning proximity indicators for numerical meeting proximity scores. In some embodiments, the user may define the specific colors associated with each meeting proximity.

In other embodiments, the proximity indicator is a symbol associated with the meeting proximity score for a meeting, where meeting coding service 272 automatically adds the symbol to the graphic interface component for the meeting. In further aspects, the proximity indicator is a position within a ranking of other meetings to be presented to the user, wherein the position indicates a relative difference in meeting proximity scores with other meetings. For example, when multiple meetings are scheduled during an overlapping time period, a meeting with a higher proximity score may be displayed in a more prominent manner relative to meetings with lower proximity scores.

For each meeting within the user's electronic schedule or within a portion of the electronic schedule, a proximity indicator may be generated by meeting coding service 272. The proximity indicator provides a mechanism to efficiently convey information about a meeting or a group of meetings to better a user's understanding of the electronic schedule and ability to make informed scheduling decisions. These proximity indicators for the meetings may be provided to the user in a calendar view or list view, such as by color coding the individual meetings in accordance with the meeting proximity score, as shown in an example graphic user interface 500 in FIG. 5 and described further below. Additionally, proximity indicators for meetings may be utilized as an option to filter meetings or as a metric for sorting meetings when viewing or searching for meetings within a user's electronic schedule.

Another example of a meeting proximity consumer 270 comprises a meeting suggestions service 274 that facilitates the creation of meetings for the user. In some embodiments, meeting suggestions service 274 suggests one or more meeting attributes, such as a meeting location or venue or a meeting date/time based on the meeting proximity indicator for the meeting attendees. For instance, an embodiment of meeting suggestions service 274 may recommend a meeting date on a weekend for a meeting with a meeting proximity score of "acquaintances" but may recommend a meeting date and time during business hours for a meeting with a meeting proximity score of "co-workers". Suggestions made by meeting suggestions service 274 may be provided automatically after attendees (who may also be referred to as invitees) are input into a meeting invitation being drafted by the user. Alternatively, suggestions may be made upon request by the user.

Another further example of a meeting proximity consumer 270 comprises a meeting rescheduling service 276 that facilitates rescheduling a meeting based on an actual or potential conflict in the user's electronic schedule. Meeting rescheduling service 276 may suggest meetings to reschedule based on the meeting proximity scores for meetings within the user's schedule. For instance, if a user is attempting to schedule a meeting within a future time period during which multiple meetings are already scheduled, one or more of the already-scheduled meetings may be identified and presented to the user as a potential meeting to reschedule to allow time for the new meeting based on the meeting proximity scores for the already-scheduled meetings. A suggestion for rescheduling meetings may also be automatically provided when an existing conflict is detected between multiple scheduled or tentative meetings within the user's electronic schedule. In some embodiments, meeting rescheduling service 276 may utilize a set of logic to determine which meetings to suggest for rescheduling. Some aspects utilize a set of Boolean rules to determine which meetings to suggest for rescheduling based on the meeting proximity scores and, in some embodiments, also based on meeting details such as date/time, venue, location, and/or topic of the meeting. For example, in one embodiment, meetings with meeting proximity scores indicating a more distant proximity between the user and additional attendees may be suggested for rescheduling over meetings with scores indicating a closer proximity. In other embodiments, meetings with meeting proximity scores indicating a closer proximity are suggested for rescheduling.

In some embodiments, the meeting proximity score output by meeting proximity determiner 268 may be modified by a user either prior to or after meeting proximity consumers 270 utilize an initial meeting proximity score from meeting proximity determiner 268. For instance, an initial meeting proximity score determined by meeting proximity determiner 268 may be provided to the user with options to confirm or modify the initial meeting proximity score prior to providing an associated meeting proximity indicator, identifying additional information for the creation of an event, or determining a meeting to reschedule. Alternatively, the user may be able to modify the meeting proximity score after the initial proximity score is utilized by meeting proximity consumers 270. In some embodiments, for example, meeting coding service 272 may apply a color or other proximity indicator to a displayed meeting event based on the initial meeting proximity score, and a user may modify the meeting proximity score (which may be presented in the form of a social proximity category) and resulting color or other proximity indicator. There may be various mechanism for the user to change the meeting proximity score for a particular meeting event, including opening the meeting event to edit meeting details, performing a right click on the meeting event and selecting an option to change the score, or selecting an option presented in a menu bar for the electronic schedule. In an example, a meeting event may be colored yellow based on a meeting proximity score of "colleague", and the user may right click on the meeting event to select "acquaintance", which may result in the meeting event to be colored purple instead of yellow. Similarly, a user may modify the meeting proximity score after meeting suggestions service 274 identified attributes for a meeting event being created based on the initial meeting proximity score, and new attributes may be suggested based on the modified meeting proximity score. Additionally, after meeting rescheduling service 276 suggests a meeting to reschedule to resolve a conflict, the user may change proximity scores for one or more meeting events, and the suggested meeting to reschedule may be updated based on the modified meeting proximity scores.

As indicated previously, one or more components of the system 200 may be incorporated into or cooperate with an application being used by the user to manage the user's schedule. FIG. 2, for instance, includes scheduling application 280, which is generally responsible for providing services facilitating management of the user's schedule, including meetings between the user and other users. Example embodiments include applications for creating, receiving, and managing meetings (which may also be referred to as appointments), such as Microsoft® Outlook® and Microsoft® Bookings. A user interface of scheduling application 280 may receive input for creating, adding, saving, or accepting meeting events or meeting invitations, and the content of the meeting event or invitation, as well as contextual information related to the communication such as the attendees, venue, location, date/time, and topic, may be provided to or otherwise made available by scheduling application 280 to other components of system 200, such as proximity determiner 260, relational profile builder 230, storage 250. Further, consumer components of system 200, such as meeting proximity consumer 270, may be integrated with or cooperate with native components of scheduling application 280.

Example system 200 also includes a presentation component 220 that is generally responsible for presenting one or more components of a user's electronic schedule, such as meeting events, meeting proximity indicators or any other output from a meeting proximity consumer 270, and related information to a user. In one embodiment, proximity determiner 260 and meeting proximity consumer 270 may operate in conjunction with or may be implemented as one part of presentation component 220. Presentation component 220 may comprise one or more applications or services on a user device, across multiple user devices, or in the cloud. For example, in one embodiment, presentation component 220 manages the presentation of communications, such as emails and instant messages, to a user across multiple user devices associated with that user. Based on presentation logic, context (which may be received from relational profile builder 230), and/or other user data, presentation component 220 may determine on which user device(s) content is presented, as well as the context of the presentation, such as how (or in what format and how much content, which can be dependent on the user device or context) it is presented, when it is presented, or other such aspects of presentation.

In some embodiments, presentation component 220 generates user interface features associated with or used to facilitate presenting to the user aspects of proximity determiner 260 or meeting proximity consumer 270 (e.g., meeting events color coded in accordance with the associated meeting proximity scores or suggestions for rescheduling a meeting based on the meeting proximity score). Such features can include interface elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts.

Example system 200 also includes storage 250. Storage 250 generally stores information including data, computer instructions (e.g., software program instructions, routines, or services), logic, profiles, and/or models used in embodiments described herein. In an embodiment, storage 250 comprises a data store (or computer data memory). Further, although depicted as a single data store component, storage 250 may be embodied as one or more data stores or may be in the cloud.

As shown in example system 200, storage 250 includes attendee proximity logic 252 and meeting proximity logic 254, as described previously, and one or more user profiles 240. One example embodiment of a user profile 240 is illustratively provided in FIG. 2. Example user profile 240 includes information associated with a particular user such as relational profile 242, proximity scores 244, information about user accounts and devices 246, and user preferences 248. The information stored in user profile 240 may be available to user-data collection component 210, relational profile builder 230, proximity determiner 260, or other components of example system 200.

As described previously, relational profile 242 generally includes information about a particular user's observed activity and/or associations, which may include user actions or activity events, related contextual information, or other information determined via relational profile builder 230, and may include historical or current user activity information. In some embodiments, relational profile 242 comprises at least part of a graph data store formed with nodes connected by edges as described above. In other embodiments, relational profile 242 for a user comprises a vector with dimensions representing various entities that may or may not be associated with the user. Proximity scores 244 refers to previously-determined proximity scores determined for the user. For example, proximity scores 244 include attendee proximity scores representing degrees of social closeness and/or types of relationships among the user and other attendees of scheduled or past meeting events. The attendee proximity scores may 244 may be saved and utilized for future meetings that include the same group of attendees. In some embodiments, proximity scores 244 also includes previously determined overall meeting proximity scores for scheduled and past meetings either stored by themselves or in association with the attendee proximity scores for that meeting.

User accounts and devices 246 generally include information about user devices accessed, used, or otherwise associated with a user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts, etc.), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 246 may store information across one or more databases, knowledge graphs, or data structures. As described previously, the information stored in user accounts and devices 246 may be determined from user-data collection component 210 or relational profile builder 230 (including one of its subcomponents). User preferences 248 generally include user settings or preferences associated with one or more scheduling apps, such as scheduling application 280. By way of example and not limitation, such settings may include user preferences about availability, including specified work days and work hours, formatting, notifications and reminders, thresholds, and/or scheduling preferences, as described herein.

Figure 3:
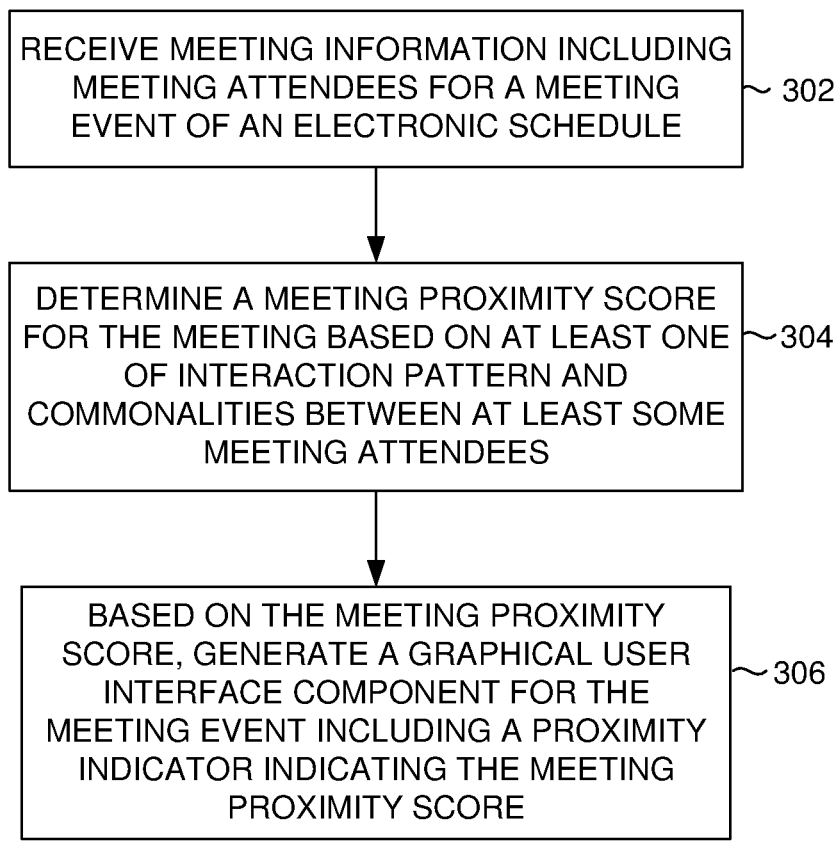
FIGS. 3-4 depict flow diagrams of methods for generating a meeting proximity in accordance with embodiments of the present disclosure.
Figure 4:
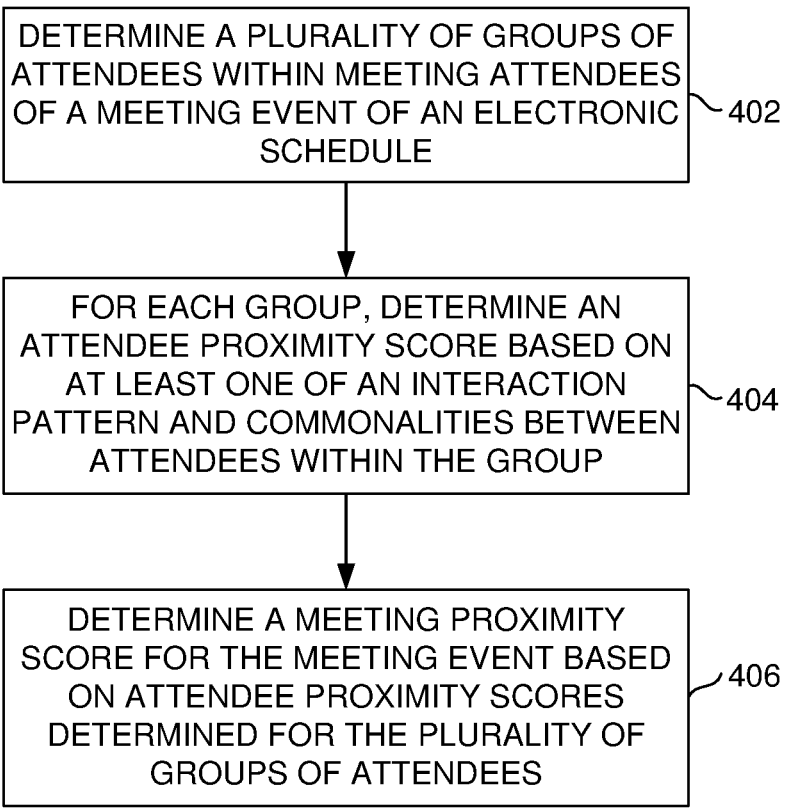

Turning to FIGS. 3 and 4, method 300 and 400 for determining and utilizing proximity scores for an electronic meeting event based on interaction patterns and/or commonalities among attendees are shown. Each block or step of methods 300 and 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, methods 300 and 400 may be performed by one or more computing devices, such as a smartphone or other user device, a server, or by a distributed computing platform, such as in the cloud.

Turning to method 300 of FIG. 300, a method of providing a meeting proximity indicator to a user based on a determined meeting proximity score for an electronic meeting event is shown. As shown at block 302, the method 300 includes receiving meeting information indicating meeting attendees for a meeting event of an electronic schedule. In some embodiments, meeting attendees may be identified based on a user name or email address entered into an attendee field within the meeting event. In some embodiments, meeting attendees may also be identified in the subject line or body of a meeting event or invitation. Meeting attendees may include attendees the meeting event organizer and attendees who have been invited and not yet accepted, who have accepted, and who are tentative. The status of the meeting attendee (e.g., whether the attendee is the organizer, accepted, is tentative, or was invited) may also be determined. Block 302 may be performed by embodiments of meeting information determiner 262 in FIG. 2 and may be carried out as further described with respect to FIG. 2.

At block 304, a meeting proximity score for the meeting event is determined based on at least one of an interaction pattern between at least some attendees within the meeting attendees and commonalities between the at least some attendees. The meeting proximity score indicates a social proximity among meeting attendees. The meeting proximity score may be based on at least one of an interaction pattern between at least some attendees within the meeting attendees and commonalities between the at least some attendees. The interaction pattern may include a frequency with which attendees have communicated and modes of communication, such as email, text messaging, instant messaging, social media communications, voice calls, and/or video calls, between attendees. An interaction pattern may also include topics of the communications between attendees. Commonalities among attendees may include a common domain (which may include, by way of example, an employer or company, an occupation, interest, or location) and common social media connections. Interaction patterns and commonalities may be determined from relational profile information, such as relational profile 242 of FIG. 2, for each attendee.

Some embodiments of block 304 include determining the meeting proximity score based on attendee proximity scores determined for groups of attendees based on an interaction pattern and/or commonalities among attendees within a group, as described further with respect to method 400 in FIG. 4. As such, a meeting proximity score may be determined by combining attendee proximity scores through application of a set of Boolean rules or making a mathematical or statistical determination, such as finding an average score for the attendee proximity scores. Alternative embodiments of block 304 include determining the meeting proximity score directly from an interaction pattern and/or commonalities in a manner similar to determining attendee scores based on relational profile information. Block 304 of method 300 may be performed by embodiments of meeting proximity determiner 268 or other subcomponents of proximity determiner 260 in FIG. 2 and may be carried out as further described with respect to FIG. 2.

At block 306, a graphical user interface component for the meeting event is generated based on the meeting proximity score. The graphical user interface component includes a proximity indicator indicating the meeting proximity score for the meeting. In some aspects, the proximity indicator is a color that is associated with the proximity score, and generating the graphical user interface component for the meeting event may include causing at least part of the graphical user interface component to be displayed as that color. Block 306 may be performed by embodiments of meeting proximity consumer 270 of FIG. 2 and may be carried out as further described with respect to FIG. 2. Additionally, the graphical user interface component may be presented to a user via presentation component 220 in FIG. 2.

Figure 5:
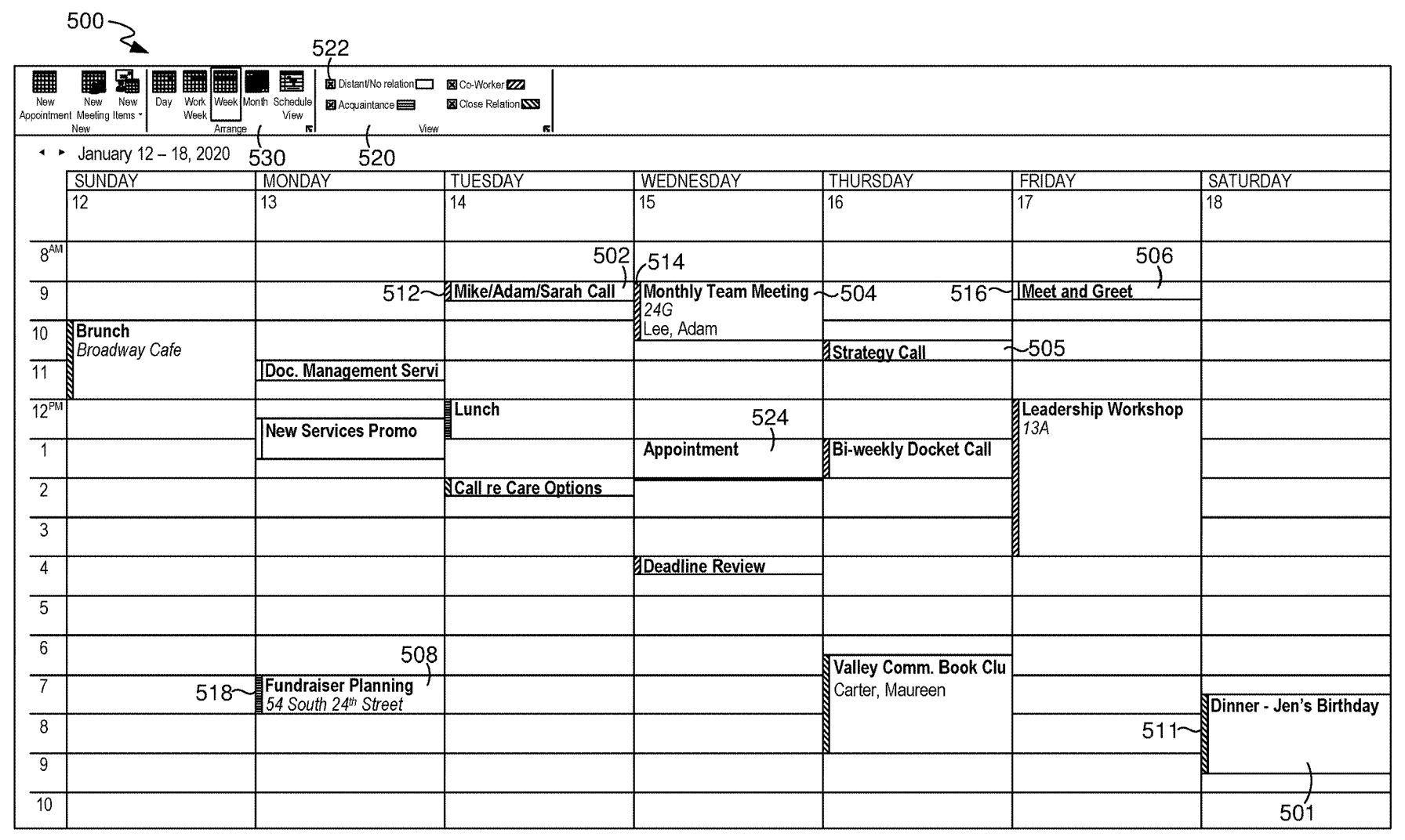

Embodiments of method 300 may include blocks 302, 304, and 304 to be performed for a plurality of meeting events on the electronic schedule. For example, meeting information indicating meeting attendees may be received for a plurality of meeting events, and a meeting proximity score may be determined for each event based on the relational profile information of the attendees for that particular meeting. As such, proximity indicators may be generated for each meeting event and provided for presentation to indicate a meeting proximity score for each meeting. For example, where proximity indicator is a color associated with a meeting proximity score, at least part of the graphical user interface component displayed for each meeting event may be colored in accordance with the meeting proximity score such that different meetings events in the electronic schedule may have different colors to represent different meeting proximity scores. An example user interface that may be generated in accordance with embodiments of FIG. 3 is depicted in FIG. 5.

In addition or alternatively to generating the graphical user interface component with a proximity indicator, a meeting proximity score determined in accordance with blocks 302 and 304 may be utilized in the creation of meeting events. For example, a method performed in accordance with an embodiment of the disclosed technology may include determining information about a proposed meeting event that includes attendees, similar to block 304. The proposed meeting event may be a meeting invitation being drafted by the user. Utilizing the attendee information, a meeting proximity score may be determined based on at least one of an interaction pattern between at least some attendees of the proposed meeting event and commonalities between the at least some attendees as described with respect to block 304. The meeting event may then be created to include the attendees with one or more meeting details being based on the meeting proximity score of the proposed meeting event. Meeting details may include time and/or date, venue, and location. For example, when a meeting proximity score indicates that the user and the attendees of the proposed meeting event are co-workers, creating the meeting event may include identifying a date and time available in the user's calendar that is also within in business hours, which may be default hours or hours set by the user. One or more heuristic techniques, a set of Boolean rules or other logic may be utilized to determine the meeting details based on the meeting proximity score. In some embodiments, creating the meeting event comprises automatically inserting the determined meeting details into the proposed meeting and adding the meeting event to the user's electronic schedule once confirmed or otherwise selected by the user. In other embodiments, the meeting details are suggested to the user but not added into the proposed meeting event until the user confirms the details.

In addition or alternatively to generating the graphical user interface components with proximity indicators and/or creating a meeting event, a proximity score for a meeting event determined in accordance with blocks 302 and 304 may be utilized to resolve scheduling conflicts. For example, some embodiments may include identifying an actual or a potential conflict between meeting events within a user's electronic schedule. An actual conflict may exist where the date and times of at least two scheduled meeting events in the user's electronic schedule at least partially overlap with one another. A potential conflict may exist where there is at least a partial overlap of the date and times of two meeting events, where at least one meeting event is not yet accepted by the user or is a meeting event that the user is in the process of creating.

The meeting proximity scores for meeting events involved in the conflict, which may be determined before or after the conflict is identified, may be utilized to facilitate resolution of the conflict. One or more heuristic techniques and/or a set of Boolean rules may be utilized to determine which meeting should be rescheduled or canceled. In an example, where two meetings conflict, it may be easier to reschedule the meeting where the attendees have a closer social proximity to the user (e.g., where the attendees are close friends of the user) than a meeting where the attendees are less acquainted. As such, in some embodiments, resolving the conflict may include determining to reschedule the meeting event that has the meeting proximity score indicating a closer social proximity In some embodiments, the meeting event determined to be rescheduled will be automatically rescheduled to an available date and time in the user's schedule. In automatically rescheduling the event, the availability of other attendees may be determined and utilized to perform the rescheduling. Additionally, the proximity score may be utilized to identify a new date and time as described above with respect to creating a meeting event. Alternatively, the determination of which meeting to be rescheduled may be presented as a suggestion for the user to select.

FIG. 4 depicts a method 400 for determining a meeting proximity score for a meeting in accordance with example embodiments of the disclosed technology. At block 402, a plurality of groups of attendees within the meeting attendees for a meeting event is determined. Block 402 may be performed after receiving meeting information as described with respect to block 302 of FIG. 3. In some embodiments, each group of attendees consists of two attendees (i.e., a pair of attendees).

At block 404, an attendee proximity score is determined for each group of attendees, thereby forming a set of attendee proximity scores. Example embodiments of block 404 may be performed by one or more components of proximity determined 160, such as relational profile comparer 264 and/or attendee proximity determiner 266, of FIG. 2. As such, an attendee proximity score may be determined based on an interaction pattern and/or commonalities among the attendees within the group. An interaction pattern may include a frequency with which attendees have communicated and modes of communication, such as email, text messaging, instant messaging, social media communications, voice calls, and/or video calls, between attendees within the group. An interaction pattern may also include topics of the communications among attendees within the group. Commonalities between attendees within the group may include a common domain (e.g., an employer or company, an occupation, interest, or location) and common social media connections. Interaction patterns and commonalities may be determined from relational profile information, such as relational profile 242 of FIG. 2, for the attendee. Commonalities may be determined by an embodiment of relational profile comparer 264 of FIG. 2. In some embodiments, an attendee proximity score for one or more groups is determined by retrieving, from a data store (such as storage 250 in FIG. 2) a previously determined attendee proximity score for that group of attendees.

Additionally, the electronic schedule may be associated with a user who is identified as a meeting attendee, and each group may include the user such that attendee proximity scores are determined based on interactions and commonalities with the user. For example, when determining a social proximity for a meeting event on Daniel's schedule with the meeting attendees being Daniel, Meredith, and Julie, the groups for which an attendee proximity score is determined may be Daniel/Meredith and Daniel/Julie and do not include Julie/Meredith.

At block 406, a meeting proximity score is determined for the meeting event based on the set of attendee proximity scores determined for the groups of attendees within the meeting attendees. The meeting proximity score may be determined by combining attendee proximity scores through application of a set of Boolean rules or making a mathematical or statistical determination, such as finding an average score for the attendee proximity scores. In some embodiments, determining the meeting proximity score includes weighting attending proximity scores within the set of attendee proximity scores based on one or more of rules, conditions, user preferences, and user history. Embodiments of block 406 may be performed by meeting proximity determiner 268 of FIG. 2 and performed as further described with respect to FIG. 2.

Some embodiments of method 400 further include generating a graphical user interface component with a proximity indicator for the meeting as described with respect to block 306 of FIG. 3. Additionally or alternatively, method 400 may include determining meeting proximity scores for a plurality of meetings within the electronic schedule and resolving conflicts between at least two meetings based on the respective meeting proximity scores as further discussed with respect to method 300. Additionally or alternatively, method 400 may include determining a meeting proximity score for a meeting event being created for the user to suggest dates/times, locations, or venues as further discussed with respect to method 300.

FIG. 5 illustrates an aspect of an example embodiment of a system for providing meeting proximity information via a graphical user interface. In FIG. 5, a user interface 500 comprises a graphical user interface on a user device, such as a smartphone. Example user interface 500 depicts a user's electronic schedule for a particular one-week period. The electronic schedule includes a plurality of meeting events, such as events 502, 504, 505, 506, 508, and 511. As illustrated, there is limited space to display details about a meeting. For instance, there is generally not enough room to list out attendees for each meeting within the meeting events displayed together in this one-week view. Further, even if there were room, it may overly clutter the display, which reduces the effectiveness of convey information to the user.

To convey information about attendees, however, many of the meeting events, such as meeting events 502, 504, 506, 508, and 511, include a graphical user interface element, such as meeting proximity indicator 512 of meeting event 502, to indicate proximity between the user and other attendees of that meeting. Proximity indicator 512 is in the form of a patterned bar as part of the interface element for meeting event 502, but it is contemplated that embodiments of proximity indicators may take other forms, such as horizontal bars or symbols, and, in some embodiments, may take up the entire meeting event within user interface 500. Additionally, proximity indicators 512, 516, 518, and 511 of user interface 500 may be colors, as illustrated in FIG. 5 as different patterns.

Different meeting events may have different proximity indicators based on the meeting proximity assigned to that meeting. For instance, meeting proximity indicator 514 indicates that attendees of meeting event 504 are co-workers; meeting proximity indicator 516 indicates that attendees of meeting event 506 have a distant or no acquaintance; meeting proximity indicator 518 indicates that attendees of meeting event 508 are acquaintances; and meeting proximity indicator 511 indicates that the attendees of meeting event 501 have a close relationship. The generation of these proximity indicators may be performed in accordance with an embodiment of meeting proximity consumer 270 of FIG. 2 based on a meeting proximity score determined by an embodiment of proximity determiner 260 of FIG. 2.

The use of these proximity indicators efficiently conveys useful and sometimes necessary information while not taking up much screen space, which may be limited. Further, the proximity indicators may be used to determine which meetings to reschedule or cancel in the event of a conflict. For instance, consider a scenario in which the user is asked on Monday afternoon to schedule a new meeting with a group of colleagues for some morning that week. Because the user has meeting each morning for the rest of the week (e.g., meting events 502, 504, 505 and 506), one of the existing meetings may need to be rescheduled, which may be done by the user or automatically. The meeting proximity indicators for meeting events 502, 504, 505 and 506 may facilitate determination of which existing meeting to reschedule or cancel based on meeting attendees. For instance, it may be decided to reschedule one of meeting events 502, 504, or 505 rather than meeting event 506 because meeting event 506 has a more distant social proximity, which may indicate rescheduling may be more difficult. In other embodiments, a more distant social proximity may make a meeting event more reschedulable or cancelable because a user may be more interested in adjusting or cancelling with attendees of a more distant social proximity In some embodiments, a computer application or service may automatically make a recommendation of which meeting to reschedule or cancel or may automatically reschedule or cancel one of the meetings as described above with respect to meeting proximity consumer 270 of FIG. 2.

Other details of meetings may still be shown in text within the meeting event where the information is available and space permits. For example, meeting event 502 includes a location or venue of the meeting (e.g., conference room "24G") and a meeting organizer ("Lee, Adam"). Additionally, the user interface 500 may include some meeting events, such as meeting event 524, without a meeting proximity indicator. For instance, meeting events that do not include any other attendees may not have a meeting indicator.

Example user interface 500 includes view menu 520, which provides options for selecting which meetings to view based on the assigned meeting proximity In some embodiments, meetings of all proximities are presented, as depicted in user interface 500, and a user can deselect certain proximities, which will result in meeting events with the deselected meeting proximities to be removed from view on the electronic schedule.

Example user interface 500 may also include a legend or mechanism in which a user can easily determine the meeting proximity for a particular type of a meeting proximity indicator (such as a particular color or pattern). In FIG. 5, for example, view menu includes a sample of each type of meeting proximity indicator next to a textual label for the meeting proximity Additionally, in some embodiments, user interface 500 may further include an option on the menu bar or within the meeting event to allow a user to re-categorize a meeting to a different social proximity (and, thus, change the displayed proximity indicator).

Although user interface 500 depicts a one-week view of a user's electronic schedule, it is contemplated that different arrangements of the electronic schedule may be viewed. For instance, arrange menu 530 provides selectable options for viewing the electronic schedule of one day, a work week, a month, and as a schedule, which may arrange time along a horizontal axis rather than a vertical axis. In any of these arrangements, proximity indicators for meetings may be provided in a similar manner as shown with user interface 500.

Accordingly, various aspects of technology directed to systems and methods for managing electronic schedules according to social proximities of meeting attendees of meetings within the schedules are provided. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 6:
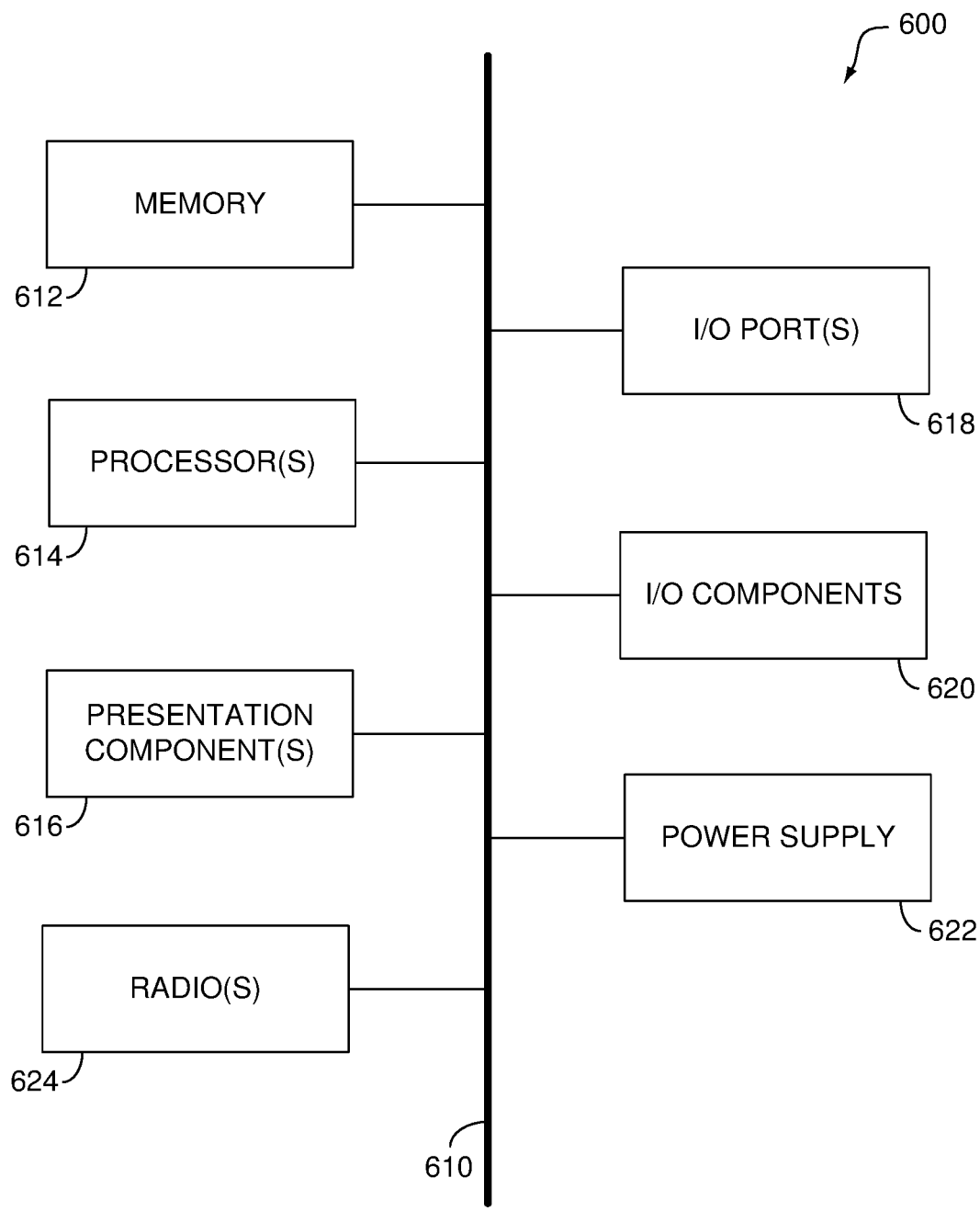
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," or "handheld device," as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include for example solid-state memory, hard drives, and optical-disc drives. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, or a wireless device. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A system for generating a user interface for meeting events, the system comprising:
 a processor; and
 computer memory having computer executable instructions stored thereon for performing operations when executed by the processor, the operations comprising:
  receiving, from an electronic scheduling application, meeting information for a meeting event of an electronic schedule, wherein the meeting information includes a plurality of meeting attendees;
  determining, for the meeting event, multiple attendee proximity scores, each of the multiple attendee proximity scores being a score indicating a social proximity between a meeting host and a different meeting attendee of the plurality of meeting attendees;
  deriving an overall meeting proximity score for a meeting based on the multiple attendee proximity scores;
  generating a graphical user interface component for the meeting event comprising a proximity indicator representing the overall meeting proximity score;
  within a calendar view of an application, presenting the proximity indicator in association with the meeting event while concurrently displaying another proximity indicator for at least one other meeting visible on the calendar view.

2. The system of claim 1, wherein the proximity indicator comprises a color associated with an indication of the social proximity among the plurality of meeting attendees, and wherein at least part of the graphical user interface component for the meeting event is displayed in the color.

3. The system of claim 1, wherein the operations further comprise receiving meeting information regarding attendees for a plurality of additional meeting events, and determining a meeting proximity score for each additional meeting event within the plurality of additional meeting events based on attendees of each additional meeting event.

4. The system of claim 3, wherein the operations further comprise generating graphical user interface components comprising proximity indicators for the plurality of additional meeting events, wherein each proximity indicator is provided for presentation with a particular meeting event within the plurality of additional meeting events and indicates the meeting proximity score for the particular meeting event.

5. The system of claim 4, wherein each proximity indicator comprises a color associated with an indication of the social proximity among the plurality of meeting attendees for the particular meeting event associated with the proximity indicator, wherein at least part of the graphical user interface component for the particular meeting event is displayed in the color associated with the meeting proximity score, wherein one or more other concurrently presented proximity indicators associated with different meeting devices are displayed in different colors within the calendar view of the application.

6. The system of claim 1, wherein deriving the overall meeting proximity score comprises:
 determining a plurality of groups of attendees within the plurality of meeting attendees,
 determining a respective attendee proximity score for each group of attendees within the plurality of groups of attendees indicating a social proximity among attendees for the group, thereby forming a set of attendee proximity scores comprising each respective attendee proximity score, the attendee proximity score being based on at least one of an interaction pattern between the attendees within the group and commonalities between the attendees within the group; and
 wherein the overall meeting proximity score is determined based on the set of attendee proximity scores determined for each group of attendees within the plurality of meeting attendees.

7. The system of claim 6, wherein determining the overall meeting proximity score based on the set of attendee proximity scores comprises one or more of applying a set of Boolean rules and determining an average score of the set of attendee proximity scores.

8. The system of claim 7, wherein determining the overall meeting proximity score further comprises weighting attending proximity scores within the set of attendee proximity scores based on one or more of rules, conditions, user preferences, and user history.

9. The system of claim 6, wherein each group of attendees consists of two attendees.

10. The system of claim 9, wherein the electronic schedule is associated with a user, and wherein each group of attendees includes the user.

11. The system of claim 6, wherein determining the respective attendee proximity score for each group of attendees comprises retrieving, from a data store, an attendee proximity score previously determined for at least one group of attendees.

12. The system of claim 1, wherein the graphical user interface component generally represents how easy or difficult it is to reschedule the meeting event.

13. A computerized method comprising:
 receiving, from an electronic scheduling application, meeting information for a plurality of meeting events of an electronic schedule, wherein the meeting information includes a plurality of attendees for each meeting event within the plurality of meeting events;
 determining, for each meeting event, multiple attendee proximity scores, each of the multiple attendee proximity scores being a score indicating a social proximity between a meeting host and a different meeting attendee of the plurality of attendees;
 deriving an overall meeting proximity score for a meeting based on the multiple attendee proximity scores;
 generating, for each meeting event, a graphical user interface component for the meeting event comprising a proximity indicator representing the overall meeting proximity score; and
 within a calendar view of an application, presenting the proximity indicator in association with the meeting event while concurrently displaying another proximity indicator for at least one other meeting visible on the calendar view.

14. The computerized method of claim 13, wherein each of the multiple attendee proximity scores is based on at least one of an interaction pattern and a commonality between the meeting host and the different meeting attendee of the plurality of attendees; and the interaction pattern comprises a frequency with which the meeting host and the different meeting attendee have communicated, modes of communication used between the meeting host and the different meeting attendee, or topics of communications between the meeting host and the different meeting attendee.

15. The computerized method of claim 14, wherein modes of communication include one or more of email, text messaging, instant messaging, social media communications voice calls, and video calls.

16. The computerized method of claim 13, wherein each of the multiple attendee proximity scores is based on a commonality between the meeting host and the different meeting attendee, the commonality including at least one of a common domain and one or more common social media connections.

17. The computerized method of claim 13 further comprising automatically resolving a conflict within the electronic schedule between at least two meeting events within the plurality of meeting events, wherein resolving the conflict includes determining which meeting to reschedule based on meeting proximity scores for the at least two meeting events.

18. The computerized method of claim 17, wherein resolving the conflict includes identifying at least one of a new time and new date for a meeting event within the at least two meeting events.

19. A computerized method comprising:
receiving, from an electronic scheduling application, information about a proposed meeting event to be added to an electronic schedule, the information including a plurality of attendees of the proposed meeting event;
determining, for the proposed meeting event, multiple attendee proximity scores, each of the multiple attendee proximity scores being a score indicating a social proximity between a meeting host and a different meeting attendee of the plurality of attendees;
deriving an overall meeting proximity score for a meeting based on the multiple attendee proximity scores;
within a calendar view of an application, displaying the meeting event along with a proximity indicator representing the overall meeting proximity score, the proximity indicator for the meeting event being concurrently displayed along with a proximity indicator for at least one other meeting visible on the calendar view of the application.

20. The computerized method of claim 19, wherein deriving the overall meeting proximity score comprises:
determining a plurality of groups of attendees within the attendees of the proposed meeting event; and
determining a respective attendee proximity score for each group of attendees within the plurality of groups of attendees indicating a social proximity among attendees for the group, thereby forming a set of attendee proximity scores comprising each respective attendee proximity score, the attendee proximity score being based on at least one of an interaction pattern between the attendees within the group and commonalities between the attendees within the group;
wherein the meeting proximity score is determined based on the set of attendee proximity scores determined for each group of attendees within the meeting attendees.

* * * * *